Nov. 24, 1931.  D. B. BAKER ET AL  1,832,959
CLUTCH
Filed Dec. 14, 1928
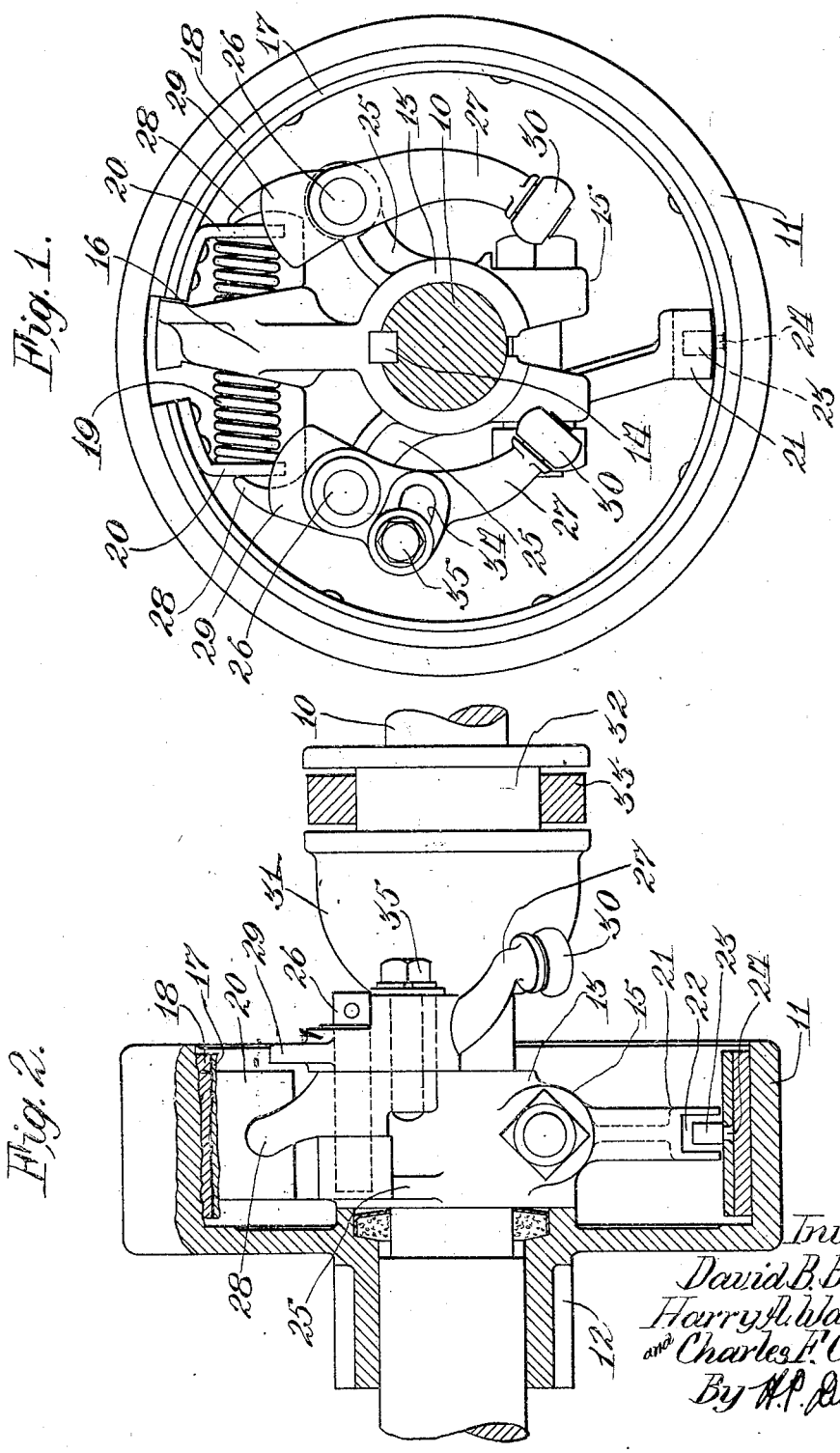
Inventors
David B. Baker,
Harry A. Watchek,
and Charles F. Crumb
By H.P. Doolittle
Atty.

Patented Nov. 24, 1931

1,832,959

UNITED STATES PATENT OFFICE

DAVID B. BAKER, CHARLES F. CRUMB, AND HARRY A. WATCHEK, OF CHICAGO, ILLINOIS, ASSIGNORS TO INTERNATIONAL HARVESTER COMPANY, A CORPORATION OF NEW JERSEY.

CLUTCH

Application filed December 14, 1928. Serial No. 325,981.

The invention relates to a clutch adapted to connect and disconnect the drive between a driving element and a driven element.

The objects of the invention are to provide an improved band type of clutch interposed between the driving and driven elements, which clutch operates on the so-called servo principle.

Another object is to provide a simplified drive clutch of the type mentioned which will be simple and effective in operation, and because of this simplicity, will not likely get out of order in operation.

Another object is to provide a wear take-up mechanism so that wear in the band may be compensated for.

Other objects will be apparent to those skilled in this art as the description progresses.

Briefly, these desirable objects are accomplished in the clutch of this invention which is interposed between a drive shaft and a driven element loose on said shaft, said driven element assuming the form of a hollow pulley. The drive shaft has keyed thereto a collar, which collar includes a pinch bind and a radial extension which functions as a driver that contacts one end of a friction clutch band. The band is of the split type in which adjacent split ends are normally spread apart by means of a spring which functions to hold the band in frictional engagement with the inner face of the pulley or driven element. The collar mentioned includes two oppositely extending arms the ends of which carry pivoted levers. At one end the levers carry rollers that are engageable by a hemispherical clutch throw-out member which when shipped axially of the drive shaft engages the rollers to move the levers so that the opposite end of the levers press shoe members on the band ends together against the force of the spring so that the band will be disengaged from the inner face of the pulley or driven element. The levers mentioned each include a stop portion which functions to prevent the band from riding laterally out of the vertical plane or end face of the driven element or pulley. One of the levers is adjustably mounted for the purpose of taking up wear. When the drive shaft is rotated and the hemispherical member is disengaged or held in its out position, the driver engages one end of the band and moves it, and as the band is held into frictional engagement with the driven element necessarily it is driven.

In the accompanying sheet of drawings illustrating a practicable form of this invention,—

Figure 1 is a face view looking into the clutch structure; and

Figure 2 is a vertical sectional view through the clutch structure.

The driving element which assumes the form of a shaft is shown at 10 and it carries loosely mounted thereon a hollow pulley or drum 11 which has a hub extension 12 formed as a gear. The shaft 10 carries a collar 13 that is made fast thereto by means of a key 14 and a pinch joint bolt 15. Extending radially from the collar 13 and formed as an integral part thereof is a driver 16 which engages the metallic liner 17 of a clutch band 18 that is normally held in engagement frictionally with the inner face of the pulley 11 by means of a spring 19 that presses against two shoe members 20 which are carried on the band at its adjacent ends, it being understood that the band is of the floating, split type. The driver 16 has faces provided to engage the ends of the metallic liner 17 of the clutch band. The shoe members 20 are secured to the liner 17 so as to provide additional abutments for the driver 16. The driver 16, being rigidly mounted on the shaft 10, drives the drum 11 when the clutch band is engaged with the drum. When the band is contracted, the drum rotates it with respect to the drum. The collar 13 also includes a spider extension 21 that has at its end a bore 22 formed therethrough which fits loosely over a pin 23 that is riveted at 24 to the metallic band liner 17. This member 21 acts to hold the band out in its proper position and to some extent also prevents lateral displacement of the band from the pulley drum.

The collar 13 has also integrally formed thereon two oppositely extending arms 25, which arms at their upper ends carry pins 26 that pivotally mount, intermediately of their ends, levers 27. At their upper ends the levers include fingers 28 which engage the shoe members 20. At the side of the fingers 28 the levers include stop portions 29 which prevent the shoe members 20 and the band, of course, from accidentally moving out laterally with respect to the pulley or drum. The opposite ends of the levers 27 carry rollers 30 which rollingly contact a hemispherical clutch throw-out member 31 which has formed therewith a groove 32 that receives a shipper member 33 operable in any approved manner to slide the member 31 which is loose on the shaft 10 with respect to the shaft.

In operation, the control member 31 is normally held out by the shipper member 33 shown in the position appearing in Figure 2. The shaft 10 may be a constantly rotating driving element. As the spring 19 exerts a force to spread the shoes 20 necessarily the band 18 is in frictional or wrapping engagement with the inner face of the drum pulley structure 11 that is loosely rotatable on the driving element 10. As the driver 16 is keyed to turn with the driving element 10, the band 18 is rotated and as the drum structure 11 is in frictional engagement with the band of course it too must rotate. The spider 21 and stops 29 function to prevent the band from moving out laterally of the drum pulley. When it is desired to throw out the clutch and stop the drive to the driven element 11, the shipper 33 is actuated in any approved manner to slide the element 31 inwardly which spreads apart the lower ends of the levers 27 and presses the fingers 28 to press the shoes 20 and the ends of the band 18 together against the force of the spring 19. This disconnects the band from the inner face of the element 11 and thus stops the rotation of the driven element and any parts that may be driven therefrom.

Wear, of course, is likely to take place on the ends of the band and accordingly a wear take-up is provided to compensate for such wear. To provide such a means one of the arms 27 is made in two parts, both of which are pivotally mounted on the pin 26, as shown in the lefthand side of Figure 1 and in elevation in Figure 2. In the position illustrated the upper inner part carries the finger 28, and the lower outer part carries the roller 30. A slot 34 is provided in said lower part through which a set screw 35 extends, said screw being threaded into a portion of the upper part of the member 27, as shown in Figure 2. By loosening the screw 35 the two parts of the lever 27 can be adjusted with respect to each other about the pin 26 for initially setting the clutch and to compensate for wear.

From this description it must now be clear that a simple driver clutch structure is provided which achieves all of the desirable objects of this invention heretofore recited.

It is the intention to cover all such changes and modifications as do not materially depart from this invention as is indicated in the following claims.

What is claimed is:

1. In a clutch, a drive shaft, a driven element including a drum loose on the shaft, a split band within the drum, shoes on the ends of the band, a spring between the shoes to press the band into frictional contact with the drum, a collar element keyed to the shaft including a driver engaging an end of the band to drive the same with the drum, oppositely extending arms formed on the collar, levers carried pivotally on the arms, means for operating the levers to press the shoes together to disengage the band from the drum, and means on the levers acting as stops to prevent endwise movement of the shoes and band relative to the drum.

2. In a clutch, a drive shaft, a driven element including a drum loose on the drive shaft, a split band held in frictional engagement with the drum, a collar fast on the shaft including a driver engaging the band to drive the same, oppositely extending arms carried on the collar, levers pivoted on the arms, means for operating the levers to press the band ends together to disconnect the band from the drum, stop means on the levers to prevent endwise movement of the band from the drum, and other stop means formed on the collar to prevent endwise movement of the band at a point substantially diametrically opposite to the aforementioned stop means.

In testimony whereof we affix our signatures.

DAVID B. BAKER.
CHARLES F. CRUMB.
HARRY A. WATCHEK.